March 24, 1936.   H. E. IVES   2,034,760
ELECTROOPTICAL IMAGE PRODUCTION
Filed Sept. 27, 1930    2 Sheets-Sheet 1

INVENTOR
H. E. IVES
BY
C. C. Sprague
ATTORNEY

March 24, 1936.  H. E. IVES  2,034,760
ELECTROOPTICAL IMAGE PRODUCTION
Filed Sept. 27, 1930  2 Sheets-Sheet 2
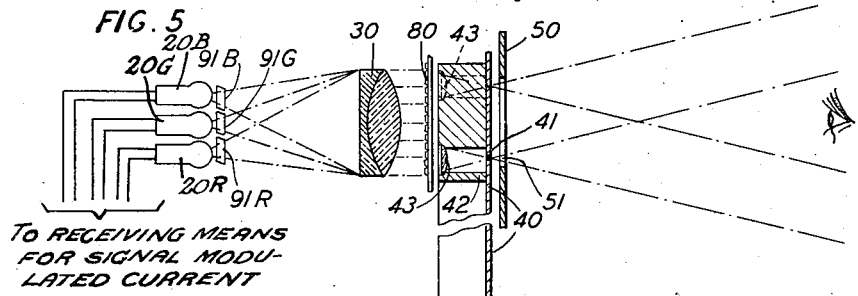
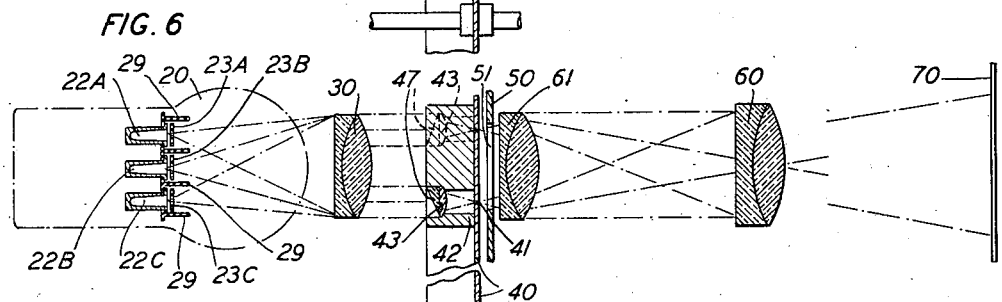
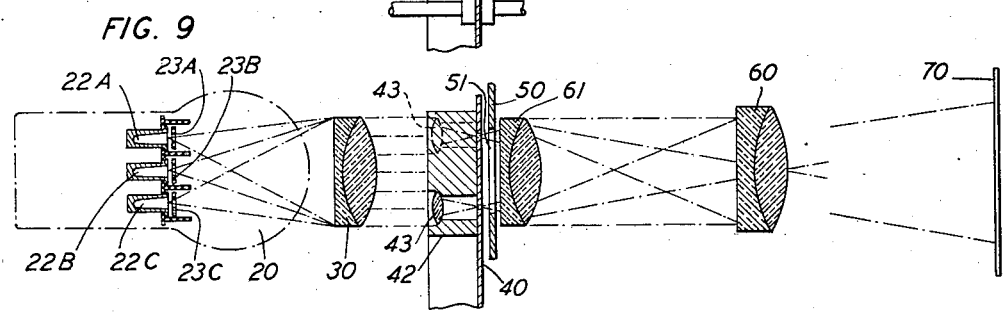
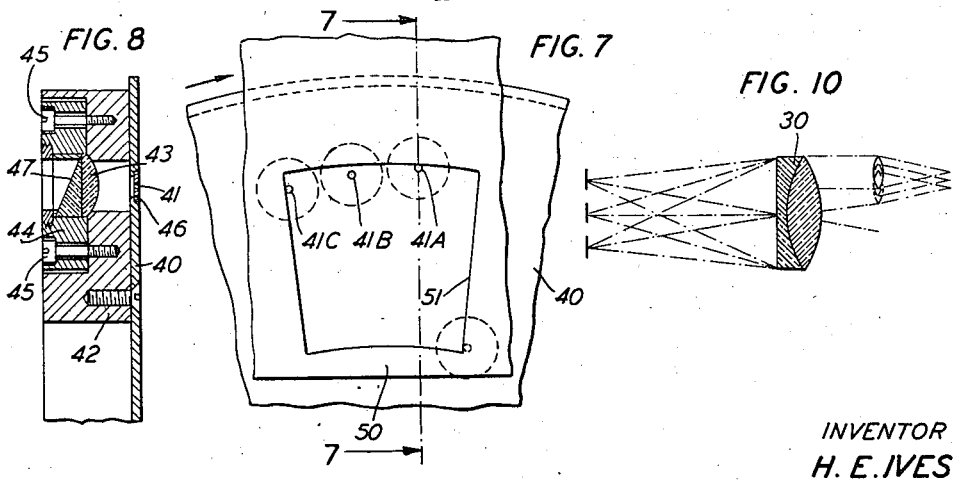
INVENTOR
H. E. IVES
BY
ATTORNEY Patented Mar. 24, 1936

2,034,760

UNITED STATES PATENT OFFICE 2,034,760

ELECTROOPTICAL IMAGE PRODUCTION

Herbert E. Ives, Montclair, N. J., assignor to Bell Telephone Laboratories, Incorporated, New York, N. Y., a corporation of New York Application September 27, 1930, Serial No. 484,820

25 Claims. (Cl. 178—6)

This invention relates to image producing means and more particularly to apertured scanning discs.

An object of this invention is to provide improved scanning means utilizing a Nipkow disc, the apertures of which are provided with lenses for focusing light upon the apertures.

This invention is adaptable to single and multiple channel operation, and to monochrome and polychrome image production.

Scanning discs ordinarily employed in television systems are of the type invented by Paul Nipkow in which the disc is provided with a plurality of small apertures in the form of a spiral. Nipkow also disclosed the idea of providing a lens in front of each aperture to focus light upon the aperture to obtain brighter images. He then covered each aperture with oiled paper or other translucent material.

In accordance with the present invention, there is employed a Nipkow disc provided with lenses, but in place of the translucent material in the apertures, an optical system is provided for efficiently utilizing and directing the rays passing through the apertures so as to form a large image upon a distant screen. The use of translucent material in the apertures to a large degree neutralizes the advantage gained by the use of lenses. The invention further contemplates the use of a disc of this kind provided with lenses for direct viewing by an observer, the translucent material being omitted from the apertures whereby images of much greater intensity are obtained.

A number of experimenters in the television field have employed a modified form of Nipkow disc in which, in place of small apertures very large apertures are used, in each of which a lens is employed, each lens in turn as the disc rotates, projecting the image of a modulated point source of light upon a screen. While it may appear theoretically that this is the most efficient means for projecting a television image, there are certain practical limitations and defects in this method. One important practical defect is that the image of the point source is projected obliquely through the lens in every case except the unique one of the middle lens of the spiral when centrally in front of the light source. As a consequence of this oblique projection, the image is distorted and poorly defined unless lenses of very high quality are used, which materially increases the cost of the apparatus. Another practical difficulty is that the lenses must all be very accurately matched as to focal length and as to the position of their principal planes with respect to each other, in order that the projected paths of the images may be of the same width.

It is found that the lens disc of Nipkow provided with lenses which focus the light upon the apertures, while comparable in its light collecting power with the scanning disc of large apertures equipped with lenses, obviates the necessity of using a large number of lenses of high quality, is free from the distortion above noted, and greatly lessens the difficulty of positioning the lenses.

In accordance with a preferred form of the invention, a cone of light of wide angle supplied by a small intense source of light controlled by incoming image currents is picked up by a large high grade condensing lens or lens system which transforms the received cone of light into a parallel beam. A rotating apertured disc provided with lenses for each aperture, as above described, is so positioned that each lens in turn passes transversely through this beam of light, the lenses of the disc being on the side adjacent the collecting lens. As explained above, the moving lenses are preferably not of high quality and may have somewhat different focal plane. The principal axis of each lens passes through a corresponding aperture and each lens has its principal focus on its axis within or adjacent to the aperture. The light emerging from each aperture emerges in the form of a cone. It is only necessary for the observer to position his eye within the field common to all of these cones to see an image of the distant object. However, the emerging cones of light may be utilized to better advantage and employed to produce a large image upon a distant screen by positioning in front of the apertured disc and at some distance therefrom a projecting lens, such as a large apertured photographic lens. This lens or lens system is of high quality and consequently projects sharply defined images at points lying considerably off its axis. The apertured scanning disc and the screen are in conjugate planes with this lens. The diameter of this projection lens may be reduced by placing another lens between the scanning disc and the projection lens since the rays diverging from the rays in the scanning disc fill a comparatively wide cone. The function of these two lenses is to divert the bundle of rays which emerge from the disc apertures so that they cross approximately the principal plane of the projection lens. It is positioned close to the apertures of the disc.

As already suggested modifications of this invention permit of its adaptation to multiple channel operation and the production of images in natural colors. In multiple channel operation a plurality of scanning light beams, equal to the number of channels, simultaneously scan the field of view, while in the color arrangement a single scanning beam comprising the primary colors in suitable mixing proportions or separate scanning beams for each primary color may be employed.

A more detailed description of the embodiment of the invention chosen for illustration follows and is illustrated in the accompanying drawings.

Fig. 5 is a diagrammatic arrangement of a modification of the receiving scanning device for color television based on the Kodacolor method of motion picture projection;

Fig. 6 is a diagrammatic arrangement of a multiple channel receiving scanning device in which prisms associated with each aperture channelize the light beams;

Fig. 7 is a front side view of a part of a sector of the scanning disc showing especially positioning of the several apertures passing the field of view at a given instant as used in multiple channel operation;

Fig. 8 is a cross-section view along the plane 7—7 in Fig. 7 of a portion of the scanning disc showing particularly the positioning of a lens and its associated prism in an aperture of the scanning disc as used in multiple channel operation;

Fig. 9 is a diagrammatic arrangement of a multiple channel receiving scanning device in which the lens associated with each aperture channelizes the light beam;

Fig. 10 is a diagrammatic drawing showing the relative optical positions of the light sources and three adjacent lenses associated with the scanning disc apertures to channelize the light beams for multiple channel operation.

Similar reference characters refer to similar parts of the apparatus.

Figure 1:
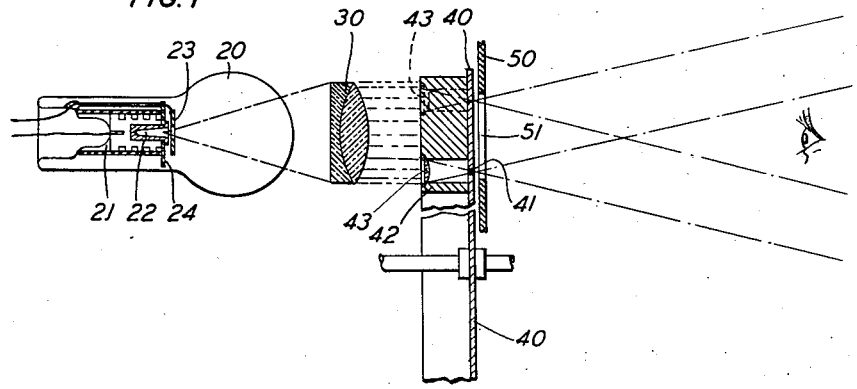
Fig. 1 is a diagrammatic arrangement of a single channel receiving scanning device arranged for directly viewing the produced image at the plane of the open end of the apertures in the scanning disc.

Fig. 1 diagrammatically shows a single channel receiving scanning device arranged for directly viewing the produced image at the plane of the open apertures of the scanning disc. A light source 20, responsive to incoming signal current, produces its light within a small area. The lamp here shown consists of a large heat radiating metallic cathode 21 having a small diameter deep crater opening 22 in which most of the light is produced and an anode 23 in the form of an annular ring positioned concentrically and directly in front of the cathode so as to permit the light to pass through its opening. Insulating material 24 covers most of the front end and sides of the cathode so as to prevent discharges from and the production of light at other points than the crater. Suitable lead-in wires provide connection with the electrodes. The electrodes are mounted in a large transparent enclosing vessel containing a suitable gas such as neon, helium, or other suitable gas or vapor at a low pressure best adapted for the generation of light. The front of the vessel is at a relatively great distance from the electrodes so as to obviate discoloring of the glass from any sputtering or other action of the electrodes as far as possible which would obstruct the passage of light. Light from the above mentioned source passes to the lens system 30 which changes the direction of the rays after passing therethrough into substantially parallel paths. This lens 30 is of sufficient diameter to cause the parallel rays to cover the entire field of view at the scanning disc. The scanning disc 40 contains a plurality of apertures 41 arranged in a spiral. By means of a suitable annular member 42 forming a part of the scanning disc a lens 43 is associated in fixed relation with each aperture. The apertures in the annular member are of large diameter at the rear side of the scanning disc, being about the diameter of the lenses 43, and they may be cylindrical or conical as the front side of the scanning disc is approached where the open end of the apertures is very small. These lenses are quite large and of comparatively short focal length. They are so positioned that the parallel rays of light from the lens 30 are focused upon the small open end of the apertures in the front of the scanning disc and upon passing beyond the apertures converge. A plate 50 having a large opening 51 defines the lateral width of the field of view. In a single channel system only one scanning aperture appears at any instant before the opening 51. An image may be viewed directly at the plane of the scanning disc by positioning the eye within the field common to all of the cones of light passing through the scanning disc apertures within the area of the field of view. In this arrangement the large stationary lens system 30 is of high quality while the rotating lenses 43 may be relatively inexpensive since their principal purpose is to concentrate the light passing through them in the small open end of their respective apertures in the front side of the scanning disc 40.

Figure 2:
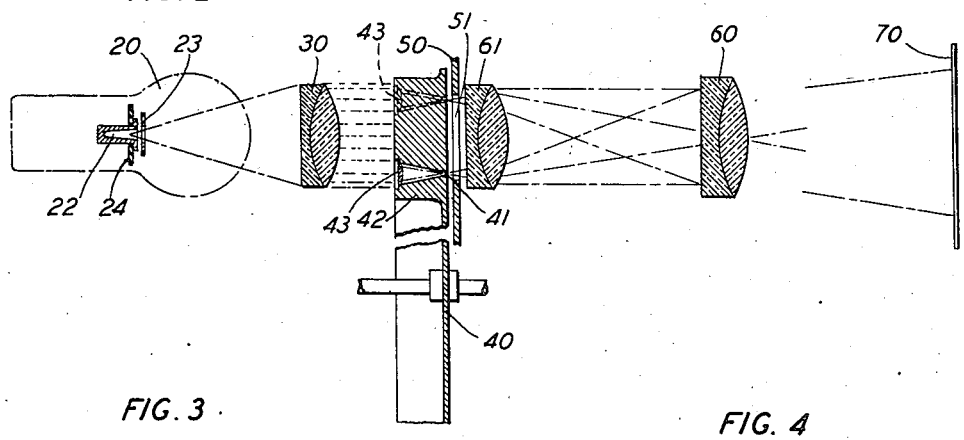
Fig. 2 is a diagrammatic arrangement of a single channel receiving scanning device similar to that shown in Fig. 1 but equipped with projection lenses for projecting the produced image onto a screen.

Fig. 2 diagrammatically shows a single channel receiving scanning arrangement similar to that shown in Fig. 1 but equipped with projection lenses for projecting the produced image upon a screen. The image is enlarged and projected upon a screen by positioning in front of the scanning disc at some distance an ordinary projection lens, such as a large aperture photographic lens 60 whose function is to project images of the light tones in the open end of the apertures upon a suitable screen 70. This lens should be of high quality and consequently project sharply defined images of points lying off its axis. The diameter of this projection lens may be reduced by placing another lens 61 between the open end of the apertures in the scanning disc and the projection lens 60 since the rays diverging from the apertures in the scanning disc fill a comparatively wide cone. The function of this lens is to deviate the bundles of rays which emerge from the scanning apertures so that they cross approximately in the principal plane of the projection lens and it is positioned close to the open ends of the apertures in the scanning disc. As the other parts of this arrangement are similar to those of Fig. 1, further description is unnecessary.

Figure 3:
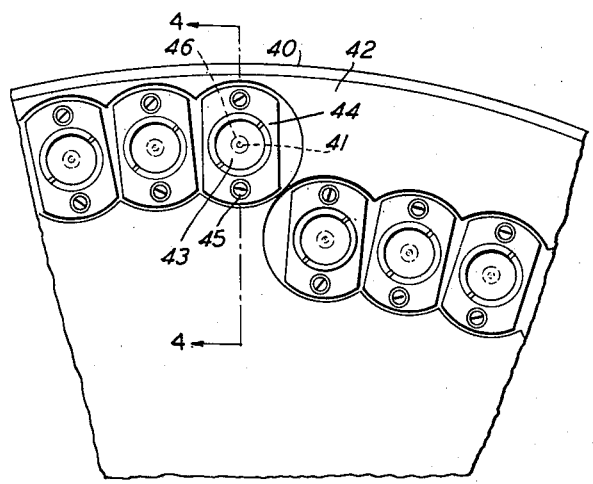
Fig. 3 is a rear side view of a part of a sector of the scanning disc showing especially the lensed ends of the apertures.
Figure 4:
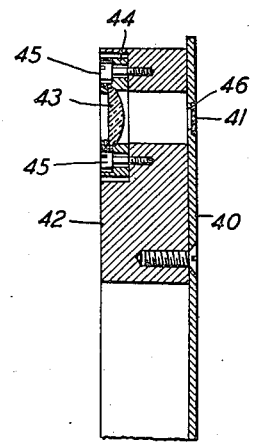
Fig. 4 is a cross-section view along the plane 4—4 in Fig. 3 of a portion of the scanning disc showing particularly the positioning of a lens in an aperture of the scanning disc.

Figs. 3 and 4 show more in detail the positioning and an arrangement of the open end of the apertures and their associated lenses comprising a unitary structure of the rotating parts of the scanning member. The lenses 43 associated with each aperture are each mounted in a holder 44 which, in turn, is fastened to the annular ring portion 42 of the scanning disc 40. The disc and ring portions 40 and 42, respectively, may be two pieces bolted together or a single piece. Holes about the diameter of the lenses are drilled in spiral arrangement in the ring 42 in such position that their centers coincide with the apertures 41 in the scanning disc member 40. These holes may be either cylindrical or conical. The supporting blocks 44 in which the lenses 43 are mounted are capable of lateral adjustment sufficient to permit positioning the optical axis of the lens 43 in line with the axis of the small apertures 41 and when so adjusted the screws 45 holding the blocks 44 are tightened to rigidly position the lenses. This adjustment readily takes care of any slight irregularities in the lenses and their mounting. In order to very accurately position the apertures 41 in the scanning disc, the apertures may first be drilled somewhat larger than required and then a thin disc 47 of comparatively soft metal fixed into the larger holes and the aperture 41 of the proper size drilled in the more workable material. Such an expedient may be especially desirable where a large diameter disc of extra tough material is used to obtain the proper strength as this material may be so tough that accurate drilling of the apertures directly in the disc becomes a difficult problem and the use of a softer insert makes the accurate positioning of the apertures much simpler.

Fig. 5 shows an arrangement for adapting this system to the production of images in natural colors since this method of projection readily lends itself to television in color by the utilization of an idea used in the Kodacolor method of motion picture projection. In this modification the optical arrangement is quite similar to that shown in Fig. 1, but there is inserted between the large fixed lens 30 and the rotating lenses in the rear side of the scanning disc a transparent member 80 impressed with a series of very small prismatic ridges having a direction normal to the travel of the scanning apertures and separate sources of primary colored light are provided. Three point light sources 20B, 20G and 20R, with appropriate filters 91B, 91G and 91R furnish the blue, green and red light which by the prismatic action of the ridges are all focused and mixed on the same aperture in the scanning disc as each aperture passes the scanning field. Because of the relatively large size of the lenses in the apertures, the prismatic ridged structure may readily be made so fine that a large number of ridges lie across a scanning lens, thereby causing a uniform mixture of the three colors. While the arrangement shown in Fig. 5 is for direct viewing an image in natural color as formed at the plane at the front of the scanning disc, the image may be projected upon a screen by adding a projecting lens system such as is shown in Fig. 2. With the exceptions noted above the other parts of this arrangement are similar to those described in Fig. 1.

Figs. 6, 7, and 8 show an adaptation of this method of projection to multiple channel operation. The light source 20 is arranged to produce as many different points of light as there are channels and these points are so spaced in the optical system that they produce beams of light taking different directions. The scanning disc 40 and its associated lenses are similar to that shown in the single channel systems above described with the exception that as many apertures appear before the field of view at any instant as there are channels simultaneously in operation. The lenses associated with the apertures for each of the different channels, excepting one of the channels are equipped with prisms 47 for deflecting the light for channelizing the light beams. In a three-channel system, such as illustrated in Fig. 6, one-third of the apertures have only the lenses, another third have added prisms which bend the light beam upwardly and another third have added prisms which bend the light beam downwardly, thus permitting each third of the apertures to be illuminated by one of the three different light sources. The third of the apertures not equipped with prisms may have added non-directional changing light transmitting members to make the light transmission through these apertures substantially the same as for the prism equipped apertures. The image may be viewed at the surface of the scanning disc directly as shown in Fig. 1 or upon a screen by means of a projection lens system such as shown in Fig. 6. A three-element light source lamp 20 is here shown but three individual light sources may also be used. This three-element lamp may be similar to that shown in Fig. 1 but constructed with three cathode craters 22A, 22B, and 22C and three corresponding anodes 23A, 23B, and 23C. Both the individual cathodes and the individual anodes may be insulated from each other and six lead-in wires used for making electrical connections with them or all of the cathodes may be electrically commoned or all of the anodes electrically commoned within the lamp, thus requiring only one lead-in wire for one side of the circuit. Insulation barriers 29 are arranged in front of the light emitting elements of each channel to prevent the discharge of any channel spreading beyond its respective channel. The electrodes are mounted in a large transparent vessel and are surrounded by a suitable gas such as neon, helium or the like at low pressure. Fig. 7 shows in detail the positioning of the three scanning apertures which are simultaneously passing the field of view at a given instant in a three-channel system. The screen 50 in front of the scanning disc contains an opening 51 bounding the field of view. A portion of a sector of the scanning disc 40 is shown so positioned with reference to the field of view defined by the opening 51 in the plate 50 that the last aperture of the spiral has just left the lower right-hand corner of the field of view and the first three apertures of the spiral are in the field of view and appear as scanning the first three lines of elemental areas across the top of the field. The scanning apertures 41A, 41B, and 41C are associated with one of the three channels A, B, and C, respectively. Fig. 8 shows more in detail a design of the scanning disc and the arrangement for mounting the lenses and prisms associated with each aperture. The scanning element consists of the disc 40 and the annular ring 42 for increasing its thickness near the periphery and for supporting the lenses and prisms associated with the apertures. In the ring and disc portions a set of spirally arranged holes are drilled, one end being large enough for receiving the lenses and the other about the size of the scanning beam. The scanning holes through these members, as heretofore stated, may be cylindrical, or tapered or conical. The details of construction are similar to those shown in Fig. 4 with the exception of the addition of the prisms 47 positioned in the apertures in association with the lenses 43. It is obvious that the arrangement is such that both the lens and the prism may be suitably adjusted with reference to their aperture 41, by slightly moving the block 44 in which they are mounted before tightening the screws 45.

Figs. 9 and 10 show a further adaptation of this method of projection to multiple channel operation. This arrangement is similar to that shown in Fig. 6 with the exception that the prisms associated with the lenses 43 are omitted and the light channelizing is obtained by adjusting the lenses 43 to cause the light beams for each different channel to take different directions, similar to that obtained with the prism arrangement but without their refraction. The light source 20 is the same as shown in Fig. 6 and all of the rest of the optical system is the same with the exception of the omission of the prisms and the positioning of the lenses 43. The apertures in the scanning member are arranged in a spiral and in a three-channel system each third of the lenses is so positioned that they focus light on the aperture coming from a different position at the light source. The lenses associated with apertures 41A, 41B, and 41C are so adjusted, as diagrammatically shown in Fig. 10, that light passing through lens 30 is focused on these apertures coming respectively from the position of the light elements 22A, 22B and 22C, respectively. While Figs. 6 and 9 of the drawings show a projection lens system for projecting an image on a screen 70, the projection system may be omitted and the image viewed at the plane of the scanning disc as heretofore described in connection with some of the other figures for direct viewing of the image.

While the multiple channel arrangement shown in Figs. 6 to 10 have been so far described as monochrome multiple channel systems, they may be readily adapted to the production of images in natural colors. All that is necessary is to apply to each of the three respective channels suitable signal current and characterize the light passing from each of the three different channels with primary colors, such as blue, green, and red. This may be done by light filters placed in the scanning apertures or in front of the three light sources either within or outside of the light sources. Also where individual light sources are used they may be such as to inherently produce the proper primary color light without the use of color filters. In this arrangement the image formed may be composed of juxtapositioned lines of the different primary colors or the lines of each group of primary color scannings may be superimposed, depending upon the alignment and the radial positions of the scanning apertures.

In all the arrangements the amount of light passing through the scanning apertures is very greatly increased, by the lens associated with each aperture over other systems in which only an open aperture is employed. The accomplishment of this by using comparatively inexpensive lenses with the apertures and maintenance of great simplicity irrespective of whether the system is applied to single or multiple channel operation or to monochrome or polychrome production of images is a decided advantage.

While the drawings and the description thereof show the invention as applied to the production of an image at the receiving station of an electro-optical system it is obvious that this method is applicable at a transmitting station for scanning an object and generating photoelectric current representing the light tone values of elemental areas of an object. When the object is flood lighted the light source shown in the drawings is replaced with a preferably small light sensitive cell. This method permits the use of a very small photoelectric cell which has very small electrostatic capacity and which in general is easier to make with high sensitivity. By the term "signal modulated light" as used in the claims is meant light modulated in accordance with the signal either directly as light reflections from the field of view at a transmitting station, or indirectly as, for example, when a light at a receiving station is energized by incoming signal modulated currents.

What is claimed is:

1. Scanning means comprising a rotatable element having a plurality of small scanning apertures therein which allow the passage of light rays with their respective directions on both ends of said apertures unchanged, a stationary source of light, a light concentrating means for each of said apertures for focusing light from said source directly thereupon, an enclosing member for each light concentrating means and its corresponding aperture, and means for causing each of said concentrating means to maintain a fixed position relative to its aperture during rotation of said rotatable element.

2. Scanning means comprising a rotatable element having a plurality of scanning apertures therein which allow the passage of light rays with their respective directions on both ends of said apertures unchanged, a stationary source of modulated light, means for focusing signal modulated light from said source upon each of said apertures comprising lenses individual to said apertures, the said modulated light being transmitted through both the said lenses and the said apertures, means for maintaining said lenses in fixed relation to said apertures during rotation of said element and an enclosing member for each lens and its corresponding aperture.

3. Multiple channel scanning means for scanning a field of view comprising a rotatable element having a plurality of small scanning apertures therein which allow the passage of light rays with their respective directions on both ends of said apertures unchanged, a light concentrating means for each of said apertures for focusing light directly thereon, means for causing each of said concentrating means to maintain a fixed position relative to its aperture during rotation of said rotatable element, and means for causing a plurality of said apertures to simultaneously scan different elemental lines of said field of view.

4. Multiple channel scanning means for scanning a field of view comprising a rotatable element having a plurality of small scanning apertures therein which allow the passage of light rays with their respective directions on both ends of said apertures unchanged, a light concentrating means for each of said apertures for focusing light thereon, means for causing each of said concentrating means to maintain a fixed position relative to its aperture during rotation of said rotatable element, and prisms associated with said apertures for causing a plurality of the apertures to simultaneously scan different elemental lines of said field of view.

5. Scanning means for producing images in natural colors comprising a rotatable element having a plurality of small scanning apertures therein which allow the passage of light rays with their respective directions on both ends of said apertures unchanged, a light concentrating means for each of said apertures for focusing light directly thereon, a source of light for each primary color, means for causing each of said concentrating means to maintain a fixed position relative to its aperture during rotation of said rotatable element, means for characterizing the light transmitted through predetermined groups of said apertures in accordance with different primary colors, respectively, and means for simultaneously projecting a plurality of differently colored scanning beams, one for each primary color component, through a corresponding number of said apertures.

6. Scanning means comprising a stationary source of light and a rotatable element having a plurality of scanning apertures of large diameter at one end and small diameter at the other end which allow the passage of light rays with their respective directions after entering the large diameter end of said apertures to remain unchanged in continuing their passing therethrough, means therein for causing light from said source entering the large end of said apertures to converge at the small end of said apertures and to pass from there with divergence equal to said convergence, and an enclosing member for each of said apertures and its corresponding converging means.

7. Scanning means comprising a rotatable element having a plurality of light channels therethrough, said channels each having a relatively large orifice at one end and a relatively small orifice at the opposite end, a light source radiating modulated light to said large orifice, the larger orifice carrying a lens having its principal focus at the smaller orifice of its aperture and the smaller orifice being open to freely transmit the light received from said lens without refraction or diffusion, and a member enclosing each of said channels between their respective small and large orifices and including the lens in the respective large orifice.

8. Scanning means for producing images in natural colors comprising a rotatable element having a plurality of small apertures therein which allow the passage of light rays with their respective directions on both ends of said apertures unchanged, a light concentrating means for each of said apertures for focusing light directly thereon, a source of light for each primary color, means for causing each of said concentrating means to maintain a fixed position relative to its aperture during rotation of said rotatable element, means for simultaneously producing light of the primary colors, means for simultaneously projecting said light upon said light concentrating means, and a refracting element positioned in the path of said light simultaneously directing the different colors through said scanning apertures.

9. Scanning means for producing images in natural colors comprising a rotatable element having a plurality of small apertures therein which allow the passage of light rays with their respective directions on both ends of said apertures unchanged, a light concentrating means for each of said apertures for focusing light directly thereon, a source of light for each primary color, means for causing each of said concentrating means to maintain a fixed position relative to its aperture during rotation of said rotatable element, means for producing light of the primary colors, means for projecting said light upon said light concentrating means, and a prismatic element of five juxtapositioned prisms positioned in the path of said light directing the different colors through said scanning apertures.

10. Scanning means for producing images in natural colors comprising a rotatable element having a plurality of scanning apertures therein which allow the passage of light rays with their respective directions on both ends of said apertures unchanged, a light concentrating means for each of said apertures for focusing light directly thereon, a source of light for each primary color, means for causing each of said concentrating means to maintain a fixed position relative to its aperture during rotation of said rotatable element, and light filters transmitting primary color associated with said apertures, the apertures being divided into groups and the said filters being applied in accordance with the different primary colors, a given primary color characterizing each aperture of the same group but a different primary color characterizing each of the different groups.

11. Multiple channel scanning means comprising a rotatable element having a plurality of scanning apertures therein which allow the passage of light rays with their respective directions on both ends of said apertures unchanged, a source of light, means for focusing signal modulated light from said source upon each of said apertures comprising light concentrating means individual to said apertures, means for maintaining said last mentioned means in fixed relation to said apertures during rotation of said element, and light deflecting elements for causing the light simultaneously passing through a plurality of apertures to take mutually exclusive paths.

12. Multiple channel scanning means comprising a rotatable element having a plurality of scanning apertures therein which allow the passage of light rays with their respective directions on both ends of said apertures unchanged, a source of light, means for focusing signal modulated light from said source upon each of said apertures comprising lenses individual to said apertures, means for maintaining said lenses in fixed relation to said apertures during rotation of said element, and prisms associated with said apertures for causing the light simultaneously passing through a plurality of apertures to take mutually exclusive directions.

13. Multiple channel scanning means for scanning a field of view comprising a rotatable element having a plurality of small scanning apertures therein which allow the passage of light rays with their respective directions on both ends of said apertures unchanged and are so angularly spaced that a plurality of said apertures are simultaneously within a field of view, a light concentrating means for each of said apertures for focusing light thereon, means for causing each of said concentrating means to maintain a fixed position relative to its aperture during rotation of said rotatable element, and means including a plurality of said light concentrating means for causing light to pass simultaneously through several of said apertures, corresponding to the several channels, in mutually exclusive paths.

14. Scanning means comprising a rotatable element having a plurality of scanning apertures therethrough, a light concentrating means associated with each aperture for converging signal modulated light thereto and from there diverging said light equal to said convergence, an enclosing member for each light concentrating means and its corresponding aperture, and means for causing a plurality of said scanning apertures to simultaneously scan respective elemental areas of a unitary field of view.

15. Scanning means comprising a rotatable element having a plurality of small scanning apertures therein which allow the passage of light rays with their respective directions on both ends of said apertures unchanged, a plurality of stationary sources of light simultaneously operating, light directing means for each of said apertures for directing and concentrating the light from said sources upon said apertures, means for causing each of said directing means to maintain a fixed position relative to its aperture during rotation of said rotatable element, and means for causing a plurality of said scanning apertures to simultaneously scan respective elemental areas of a unitary field of view.

16. Scanning means comprising a rotatable element having a plurality of small scanning apertures therein which allow the passage of light rays with their respective directions on both ends of said apertures unchanged, a plurality of stationary sources of light simultaneously operating, a lens associated with each of said apertures having its principal axis passing through its respective aperture and its principal focus substantially on its axis and adjacent to the aperture, means for causing each said lens to maintain a fixed position relative to its respective aperture during the rotation of said rotatable element, and means for causing a plurality of said scanning apertures to simultaneously scan respective elemental areas of a unitary field of view.

17. Scanning means comprising a rotatable element having a plurality of small scanning apertures therein which allow the passage of light rays with their respective directions on both ends of said apertures unchanged, a stationary modulated source of light, a light concentrating means for each of said apertures having its principal focus at its respective aperture, an enclosing member for each light concentrating means and its corresponding aperture, and means for causing each of said concentrating means to maintain a fixed position relative to its aperture during rotation of said rotatable element.

18. Scanning means comprising a rotatable element having a plurality of scanning apertures therein which allow the passage of light rays with their respective directions on both ends of said apertures unchanged, a stationary modulatable source of light, means for focusing the modulated light from said source on each of said apertures comprising lenses individual to said apertures, an enclosing member for each lens and its corresponding aperture, the modulated light from said source being transmitted to both the said lenses and the said apertures, and means for maintaining said lenses in fixed relation to said apertures during rotation of said elements.

19. Scanning means comprising a rotatable element having a plurality of scanning apertures therethrough, a stationary source of modulated light, a light concentrating means associated with each aperture for converging said modulated light thereto and therefrom diverging said light equal to said convergence, and an enclosing member for each of said apertures and its corresponding light concentrating means.

20. An electro-optical system comprising means to produce a beam of parallel rays of signal modulated light, a plurality of focusing means for causing bundles of said rays to pass through the principal focus of said focusing means respectively, a rotatable member having a plurality of clear apertures therein through which light rays may pass without changing the direction of the outgoing rays with respect to the incoming rays respectively, means to fixedly position each of said focusing means with its principal focus substantially in a clear aperture individual thereto, and an enclosing member for each of said focusing means and its corresponding aperture.

21. An electro-optical system comprising a stationary focusing means, a plurality of simultaneously operating separated substantially point sources of light located in a plane which passes through the principal focus of said focusing means and is perpendicular to the optical axis of said focusing means, movable focusing means having its axis at all times parallel to the axis of said stationary focusing means, means to move said movable focusing means across the emergent beam from said stationary focusing means at a point in said emergent beam where it is composed of rays from all said separated light sources, a lenticular refracting element positioned in the path of said emergent beam, and an opaque movable screen located transversely of the axis of said movable focusing means and having an aperture at substantially the principal focus of said movable focusing means.

22. An image producing system comprising a stationary focusing means, a plurality of separated substantially point sources of light, means to separately modulate the light emitted from said sources in accordance with image currents, a rotatable disc carrying a plurality of lenses and rotatable about an axis parallel to the axis of said focusing means, said lenses traversing the emergent beam from said focusing means formed by rays from each of said sources, an opaque disc coaxial with said lens disc and rotatable in fixed relationship thereto and positioned substantially in the principal foci of said lenses, an aperture in said opaque disc corresponding to one of said lenses located at the focal point of the rays from one source, and another aperture in said opaque disc corresponding to another of said lenses located at the focal point of the rays from another of said sources.

23. A scanning device comprising a disc rotatable about an axis perpendicular thereto and carrying a plurality of lenses arranged in a spiral and having their axes parallel to the axis of said disc, at least two simultaneously operating substantially point sources of light lying in a plane perpendicular to said axis, a stationary lens arranged between said lens disc and light sources with its principal focus substantially in the plane of said light sources, an opaque disc passing through the principal foci of the lenses of said lens disc and rotatable about the same axis as said lens disc in fixed relationship to said lens disc, a set of apertures in said opaque disc located at the focal points of the light rays from one said source, and another set of apertures in said opaque disc located at the focal points of the light rays from another said source.

24. Scanning means comprising a rotatable element having a plurality of light channels therethrough, said channels each having a relatively large orifice at one end and a relatively small orifice at the opposite end, lenses mounted in said large orifices, respectively, each having its principal focus at the corresponding small orifice and each small orifice freely transmitting the beam of light received from its associated lens without change of direction of the component rays of said beam, and the remaining portion of each of said light channels being free of focus-blurring elements, means enclosing each of said channels between their respective small and large orifices and including the lens in the respective large orifice, and a light source radiating light to each of said lenses in turn as said rotatable element rotates.

25. Scanning means comprising a rotatable element having a plurality of light channels therethrough, said channels each having a relatively large orifice at one end and a relatively small orifice at the opposite end, lenses mounted in said large orifices, respectively, each having its principal focus at the corresponding small orifice and each small orifice freely transmitting the beam of light received from its associated lens without change of direction of the component rays of said beam, and the remaining portion of each of said light channels being free of focus-blurring elements, means enclosing each of said channels between their respective small and large orifices and including the lens in the respective large orifice, and a stationary light source radiating light to each of said lenses in turn as said rotatable element rotates.

HERBERT E. IVES.